Sept. 19, 1961   H. L. PHILLIPS ET AL   3,000,237
METHOD OF MAKING DIES FOR FORMING CARDBOARD BLANKS
Filed March 2, 1959   5 Sheets-Sheet 1
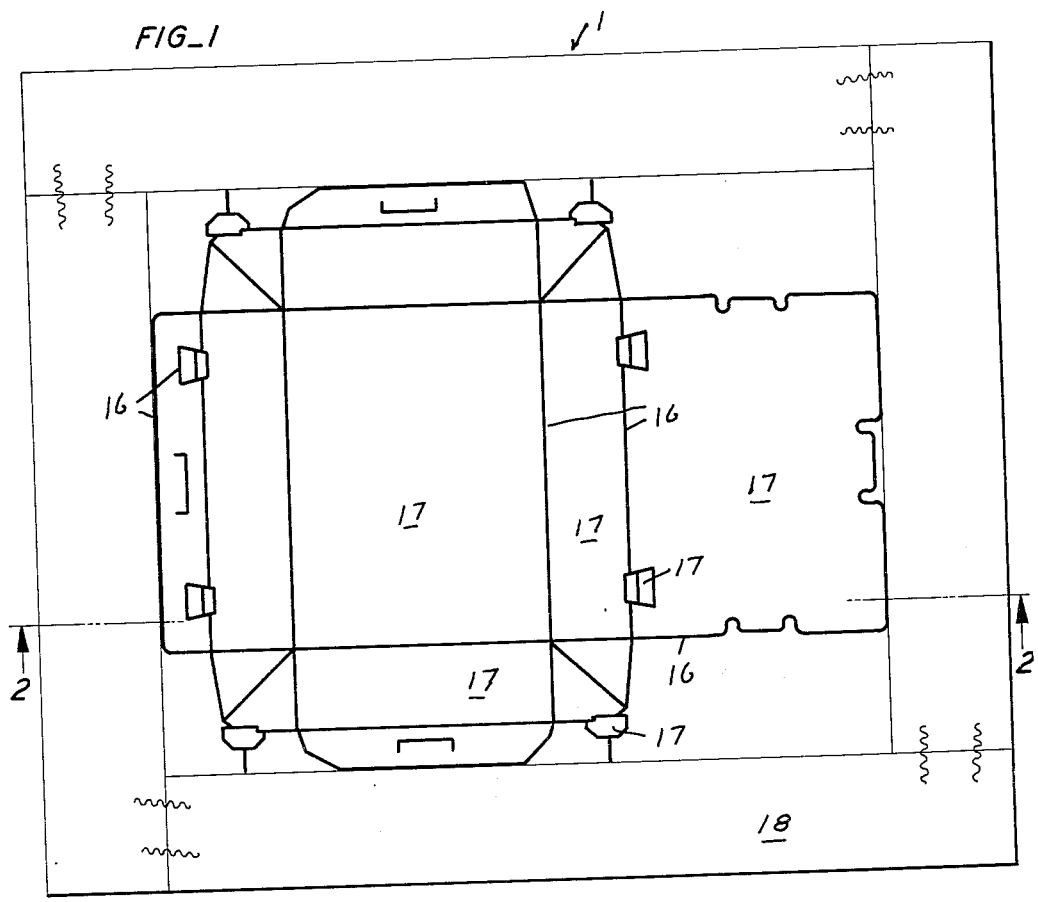
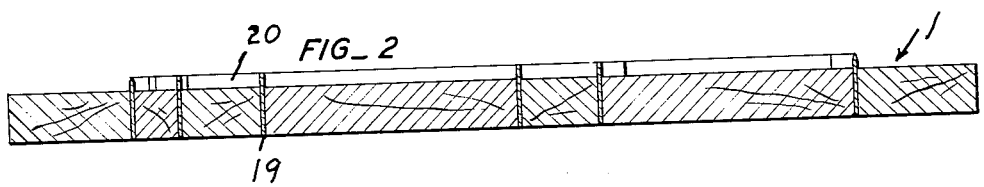
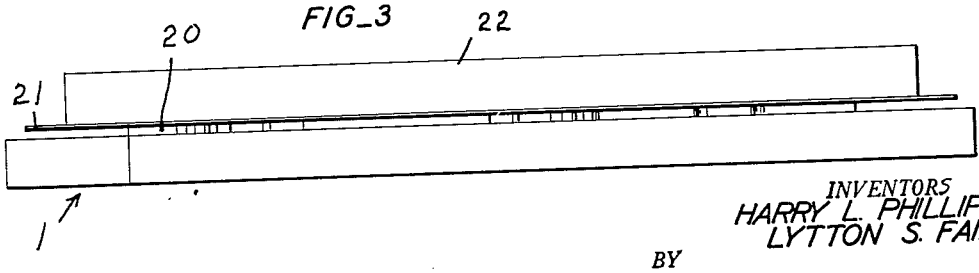
INVENTORS
HARRY L. PHILLIPS
LYTTON S. FAIN
BY
Bogkin, Mohler & Wood
ATTORNEYS

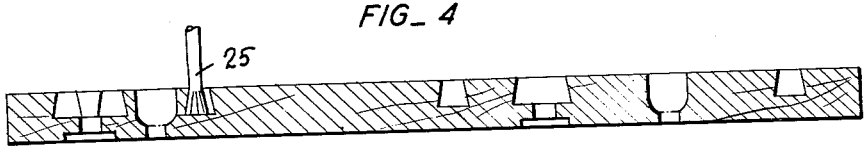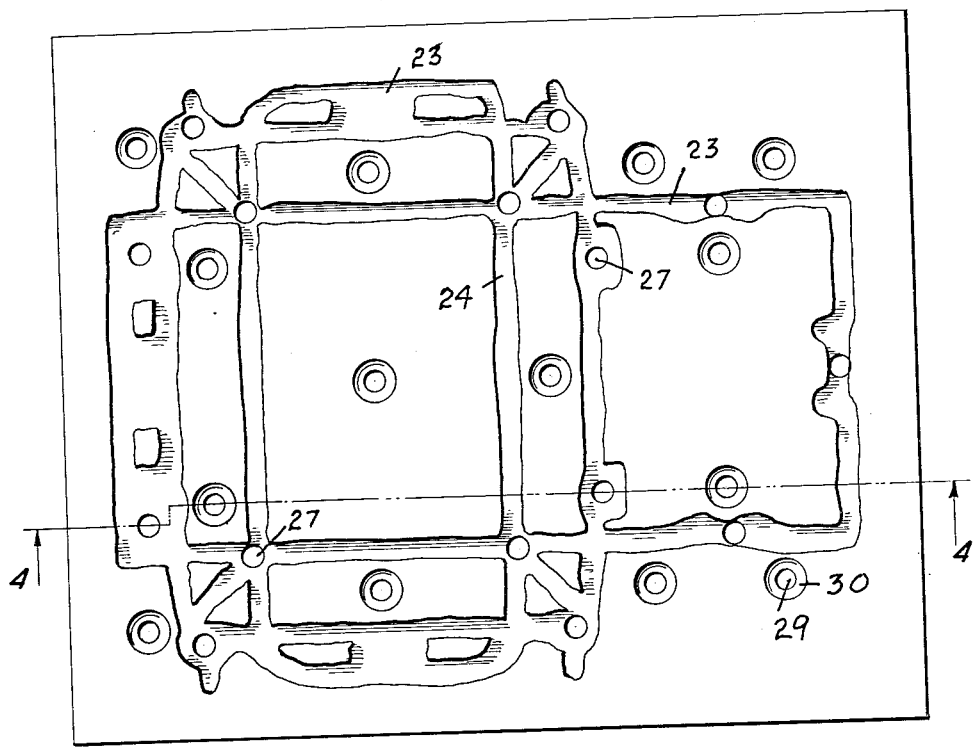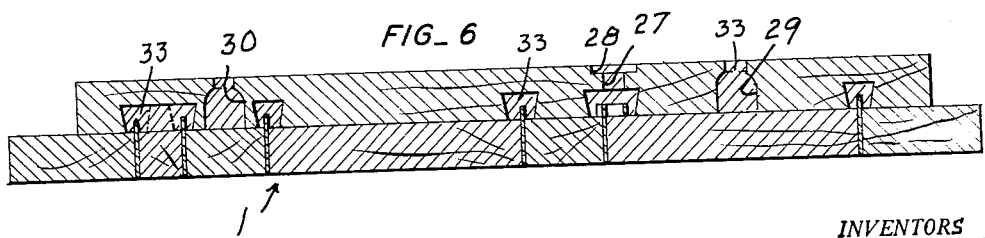

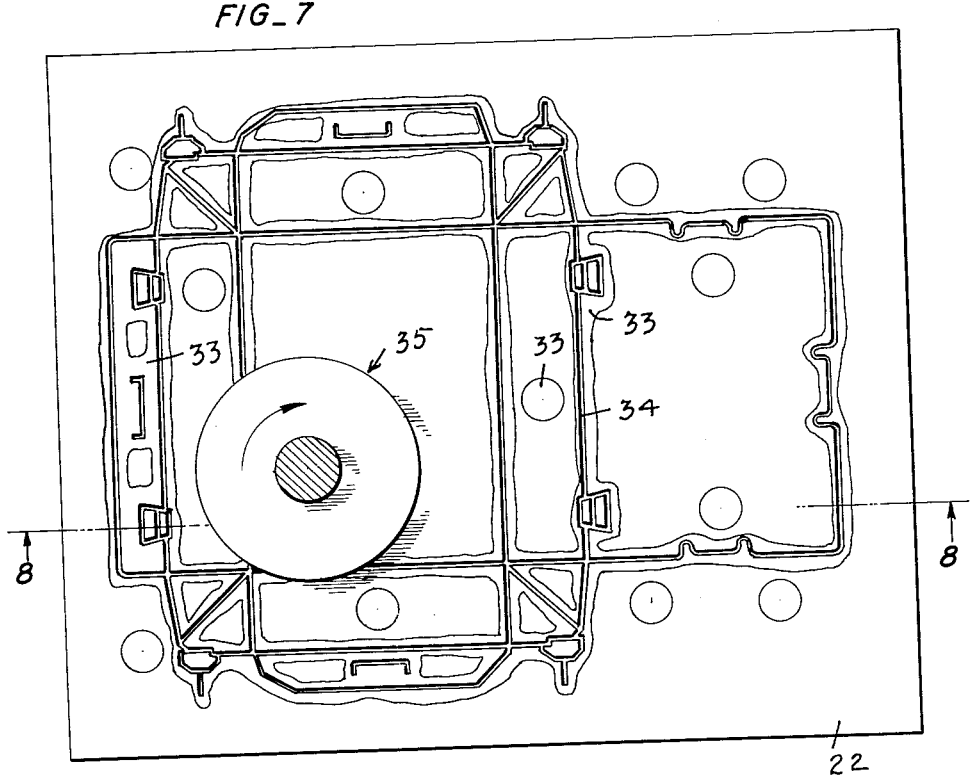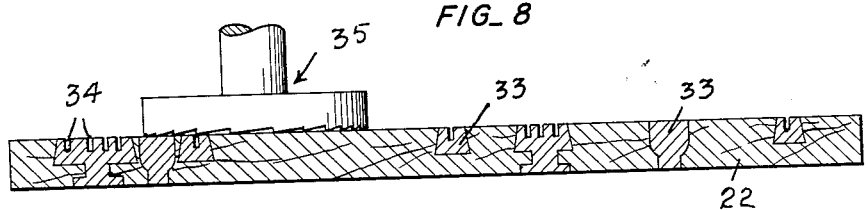

Sept. 19, 1961   H. L. PHILLIPS ET AL   3,000,237
METHOD OF MAKING DIES FOR FORMING CARDBOARD BLANKS
Filed March 2, 1959   5 Sheets-Sheet 4
FIG_9
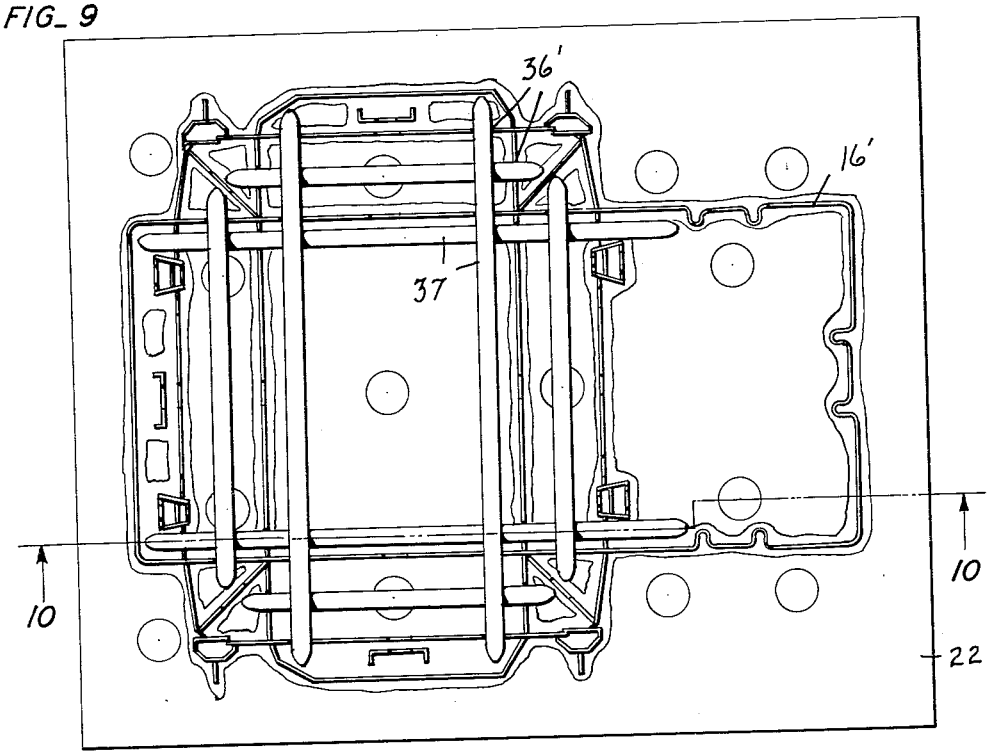
FIG_10
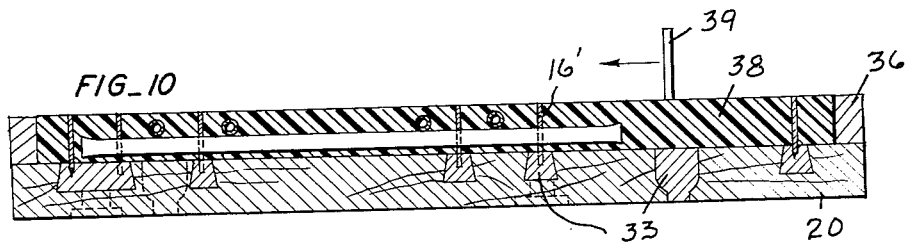
FIG_11
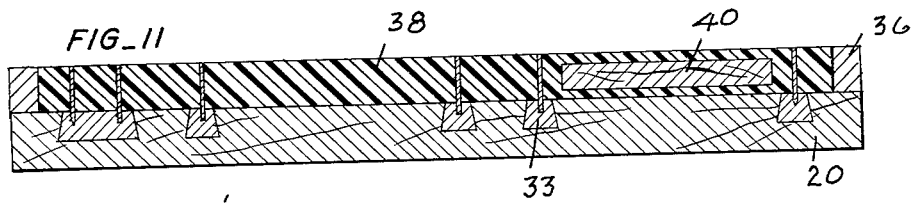
FIG_12
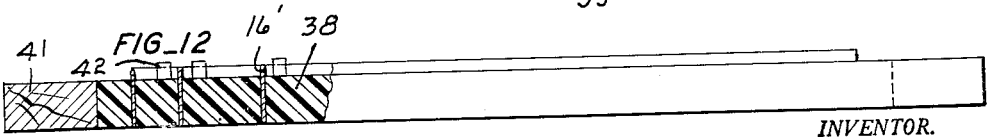
INVENTOR.
HARRY L. PHILLIPS
LYTTON S. FAIN
BY
Boyken, Mohler & Wood
ATTORNEYS

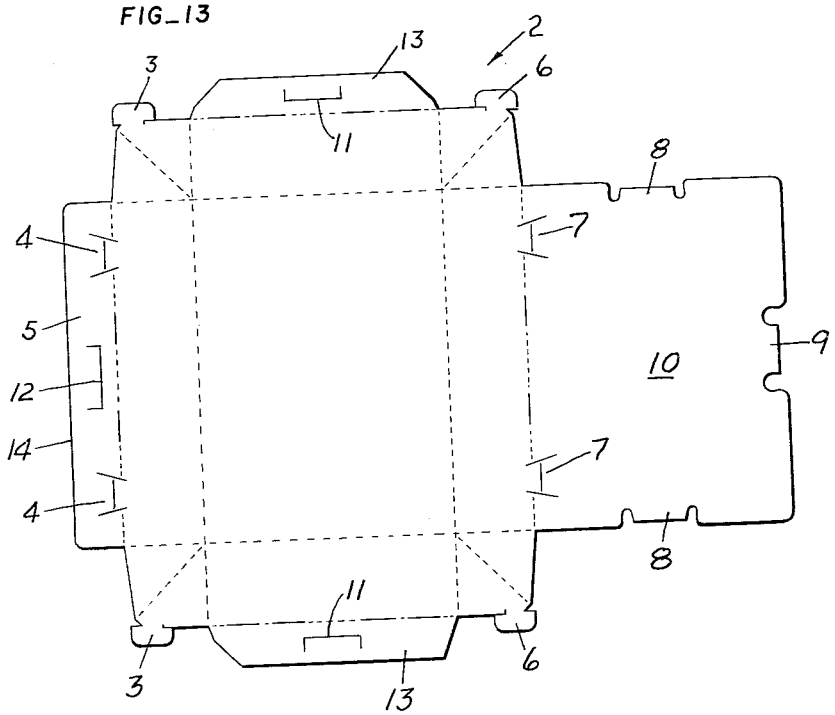

3,000,237
METHOD OF MAKING DIES FOR FORMING CARDBOARD BLANKS

Harry L. Phillips, Piedmont, and Lytton S. Fain, San Leandro, Calif., assignors, by direct and mesne assignments, to Floseal Corporation, Oakland, Calif., a corporation of Delaware
Filed Mar. 2, 1959, Ser. No. 796,633
9 Claims. (Cl. 76—107)

This invention relates to a mold for use in making dies that are adapted to form cardboard blanks, such, for example, as the blanks for folding cartons.

One of the objects of the invention is an improved method of making a mold that is adapted to be used in making dies of the type having steel cutting and creasing rules for cutting and creasing cardboard for forming carton blanks, and which mold enables the rapid, accurate and economical making of any number of uniform dies, each the exact counterpart of the other.

Another object of the invention is the provision of an improved mold that is highly accurate, rugged, economical to make, light in weight, and that can be made by relatively unskilled labor once the accurate master die is made.

Heretofore, it has been the practice in the folding carton industry to make the carton forming dies from steel cutting and creasing rules that are bent to the desired forms, and which rules are held in assembled relation to form the die, by means of blocks of plywood that are cut out by a jigsaw and positioned between the rules. A chase around the assembly is to hold the rules and blocks together.

With the development of cartons having complicated tabs and recesses that must register to interlock when the blanks are folded to set up positions, the forming of the rules and their supporting blocks have become so complicated that the most expert die makers usually require from eight to ten hours to shape the blocks and to shim the rules so that the rules are in a sufficiently accurate position to form a single die for forming a single carton blank at a time, and which blank is adapted to be satisfactorily folded in the automatic box forming machines. Once a conventional die of this type is in the press, and is in operation, the rules sooner or later shift in the die relative to each other due to the impossibility of their being held by the intricately formed blocks and the shims. This relative movement results in the cutting and creasing of parts that will not register and interlock when the blank is folded. Since modern presses form many thousands of blanks in a very short time, usually many thousands of inoperative blanks are formed before it is discovered that the rules have shifted. The resulting loss in the industry is very high.

Also, in the box making and packaging industry, normally many dies are employed at the same time in the same press for making a plurality of the same blanks at the same time. By the conventional methods heretofore practiced, it is practically impossible for any two dies to be exactly alike, and it is impossible for the rules in all of the dies to be maintained rigid relative to each other for the same time. One die may become faulty before the others, and usually this occurs at indefinite and unpredictable intervals. When it happens, and as soon as the fault is discovered, the press must be stopped and the faulty die replaced or corrected, with the resulting loss of time during which time many thousands and hundreds of thousands of blanks would have been produced had not the dies failed.

With the present invention it is virtually impossible for a die to fail due to the rules shifting relative to each other and once a master die or pattern is produced any desired number of dies of substantially no greater weight than the conventional dies may be quickly produced and ready for use within a few hours, each die having the rules rigidly, but releasably held so as to replace worn dull or damaged rules, and each die the exact counterpart of the master die pattern.

In this method of making the dies, one of the most important steps is the making of the mold that is to support the rules of the die during the casting of the casting material around the rules so supported.

The heretofore methods of making the mold have been either too long in the making thereof, or the rules have not been held with sufficient rigidity, or the molds have been too heavy and expensive and inaccurate, or a combination of these objections. In any event, up to the present time the faults in the old conventional dies and methods have been less than the faults in the various solutions that have been suggested.

The present invention overcomes the various objections heretofore considered insuperable, and one of the objects of the invention is the provision of a method and means for overcoming the said objections.

Other objects and advantages will appear in the description and drawings.

In the drawings:

FIG. 1 is a top plan view of a conventional die.

FIG. 2 is a sectional view taken along line 2—2 of FIG. 1.

FIG. 3 is an edge view showing the conventional die below a plywood panel with a piece of carbon paper between the rules of the conventional die and said panel. This is the initial step in the method, after the conventional die is formed.

FIG. 4 shows the second step in the method, in which the panel of FIG. 3 is routed out along the lines defined by the rules of the conventional die.

FIG. 5 is a sectional view along line 5—5 of FIG. 4.

FIG. 6 is a sectional view showing the next step following that of FIG. 5 in which the panel of FIG. 5 is positioned over the die of FIG. 1 with the projecting rules of the die extending into the recess routed out of the panel and with the metal allow filling said recess and other openings.

FIG. 7 shows a plan view of the panel carrying the metal casting in its recessed side and showing the grooves formed by the rules of the die. The step of cutting off a thin layer is indicated.

FIG. 8 is a sectional view taken along line 8—8 of FIG. 7.

FIG. 9 shows the panel of FIG. 8 with the rules of the die that is to be formed held in the grooves of the casting and also the reinforcing bars are shown.

FIG. 10 is a sectional view showing a frame around the rules of FIG. 9 and the epoxy plastic filling the spaces between the rules.

FIG. 11 shows the structure of the die in which filler blocks are employed in the large areas within the plastic.

FIG. 12 is an edge view showing the finished die in a chase.

FIG. 13 is a plan view of a blank formed by the die of FIG. 12.

In detail, FIG. 1 shows a conventional die, generally designated 1, that is adapted to form the carton blank 2 illustrated in FIG. 13. This blank is a design that has been commercially produced, and it illustrates the accuracy in registers that must exist and be maintained if the blank is to be capable of being folded to form a box. The tabs 3 of the blank must fit and interlock in the openings that are closed by the bendable tabs 4 in flap 5, and similar tabs 6 must fit in the openings closed by bendable tabs 7, while the edge tabs 8, 9 in the cover panel 10 must extend through the openings 11, 12 that are respectively in flaps 13, 14. Very small tolerances are permitted since the carton when formed by folding the blank must be relatively rigid and tight. The relative shifting of any of the rules for making any of these tabs or openings, would result in a faulty blank that would fail to properly fold in the automatic folding machine for making a box. Since the rules for forming these interlocking parts are usually the most complicated and intricate and the most difficult to support with any degree of accuracy, it is usually in these groups where the relative shifting of the rules occurs.

Referring to FIG. 1 again, the conventional die comprises cutting and creasing rules 16 that are held in place by wooden blocks 17 interposed between the rules, and a chase 18 may surround the assembly for holding the rules and blocks together for handling as a unit, or in the press. The rules 16 project from one side of the die along their cutting and creasing edges, as at 20 (FIG. 2). The distance that the rules project is determined by the character of the job to be done, including the type of cardboard to be used.

The rules are of substantially the same width, except that the cutting edges on the cutting rules may project a slightly greater distance, hence the thickness of the blocks determines the distance the rules project. The base edges 19 of the rules which are opposite to the cutting and creasing edges are coplanar with the surfaces of the blocks and the die of FIG. 1 to be used in an operation, the base edges of the rules and the blocks would be supported on a rigid bed.

In the present method, the blocks are preferably not quite as thick as were the conventional die 1 to be used for cutting and creasing. For example, they may be approximately one-sixteenth of an inch less in width, with the result that the rules will project that much further than in an actual die to be used. This figure is not intended to be restrictive, although it is a fair example of a dimension that may be used.

Once this die is formed, it is placed horizontally on a rigid bed and a sheet of carbon paper 21 (FIG. 3) is laid over the rules with the carbon-faced side up. On top of the carbon paper a plywood panel 22 is centered over the rules so that a marginal portion of the block extends beyond the outermost rules of the die. This panel 22 may be of approximately the thickness of the blocks 17, although this exact thickness is not critical.

The panel 22 is then lightly tapped or pressed against the carbon paper so that an exact accurate imprint of the rules 16 will be made on the lower side of the panel. Obviously the die could be inverted over the block, but the chance for the rules and blocks shifting makes it preferable that the die be firmly supported on a flat bed when the imprint is taken.

After the imprint is made on the side of panel 22, the latter is turned over and the imprinted side is routed out a substantial distance greater than the degree to which the rules project from die 1, along the lines of the imprint, to produce recesses in the panel of substantially uniform depth that generally follow the outline of the rules, as seen in FIG. 5. The outer outline or recess 23 is continuous and it is joined by those at 24 along the lines of the cross rules, and where some of the intricately formed or closely grouped smaller rules are located the area covered by these rules is completely routed out.

Using an undercutting router 25 (FIG. 4) it will be seen that the opposite sides 26 of the recesses (FIG. 4) are undercut. The minimum width of the recesses is greater than the thickness of the rules and the open sides of the recesses extend outwardly from opposite sides of the lines that were imprinted on panel 22.

Also formed in the panel 22 are pour openings 27 that are counter bored on the underside of the panel, so as to be enlarged at said underside as at 28. These openings are in the bottom of certain recesses at different points over the area of the die.

Other openings 29 are formed for knockout pins, which openings are normally in the uncut portions of the panel at different spaced points both inside and outside the outline of the routed out portions. These openings are enlarged or counterbored on the upper side as at 30, and the enlarged portion extends relatively deep into the panel (FIG. 4).

After the panel 22 is recessed and if formed with openings 27, 29, it is again centered over the die so that the rules project into the recesses but are spaced from the opposite sides and bottoms of the recesses. The panel is then tightly clamped against the wooden blocks of the die 1 by any suitable clamping means, such as C-clamps or the like.

FIG. 6 shows the panel over the die 1 with the rules projecting into the recesses in the panel. When the panel is in this position, a casting material 33, such as a metal alloy, is poured through pour openings 27 to fill the recesses around the rules to the level of the upper surface of the body of die 1 and to the lower surface of panel 22. Also this casting material is poured into openings 29 to fill the latter. An alloy of approximately fifty-eight percent (58%) bismuth and forty-two percent (42%) tin has been found to be satisfactory for the alloy, since it has a melting and pouring temperature of approximately 281° F. At this temperature the wood of panel 22 is not burned nor is the temper of the steel rules effected. Most important, however, is the fact that there is a slight expansion upon cooling and hardening, with the result that there is no shrinkage away from the rules, and it is in tight engagement with the rules.

Other alloys may be used such as those including lead and antimony, but under any circumstances, it is preferable that there be no shrinkage whatsoever away from the rules, and that the casting material quickly harden and have adequate strength to support and hold the rules in precisely the same positions they are when held by the die 1 after the panel 22 having grooves formed therein by the rules, has been removed from the die, and rules corresponding to those of the die are re-inserted in the grooves.

After the casting material 33 has hardened, which occurs relatively quickly inasmuch as it is at only approximately 281° F. when poured, the panel 22 with said casting material 33 firmly locked thereto in the undercut recesses, and also locked by the metal in openings 27 and the enlarged ends 28 of said openings, is removed from the die. Upon such removal, the metal 33 will have grooves 34 (FIGS. 7, 8) formed therein, which are the exact complement of the projecting portions 20 of the rules 16. Inasmuch as there may be some irregularities in the surface of the panel, and in the exposed casting material, a rotary disk type cutter 35 is used to remove a thin layer from the side of the panel having grooves 34, including the exposed casting material. Since the depth of the grooves is slightly greater than the distance the rules in the finished die are to project, the layer that is removed from this panel should only be sufficient to reduce the depth of the grooves to exactly the distance the rules in the finished die are to project above the body of the die. In the example given, this may be one-sixteenth (1/16) of an inch. Obviously this depends upon the distance the rules projected from die 1 beyond that at which the rules in the finished die are to project.

The use of the rotary disk type cutter is essential to prevent the cut material from falling into the grooves. With the disk type cutter the cut material is thrown clear of the grooves, which is not the case with a conventional planer.

The removal of the layer from the face of the panel having the grooves, provides a smooth, planar surface right up to the grooves, that is level and it clears off any metal that may have run into a possible crack or space between the panel 22 and the body of the die.

The casting material that is in the openings 29 forms knockout pins to be employed in separating the final die from the mold, said panel with its metal filled recesses and grooves being the mold. This mold is relatively light in weight, being of the conventional plywood used in making conventional dies, and made from hardwood. It will not be distorted due to the inlay of casting material since the latter is only substantially along the lines that define the outline of the rules. The casting material expands into very tight inseparable engagement with the sides and bottoms of the recesses, and into releasable engagement with the rules. The casting material is all readily salvageable after the mold has served its purpose, and the panels may be kept and used again for making the same mold, if desired. It is almost impossible to injure the molds since the wood surrounds the metal in which the grooves are formed.

After the mold has been completed, as above described, the next step in making the die is to position a frame 36 around the pattern for the rules, and the rules 16' are then inserted into the grooves in which they are very rigidly held. Some of the rules at opposite sides of the larger blank areas of the mold may be notched at 36' to receive reinforcing bars of aluminum or other suitable metal. The bars are indicated at 37.

FIG. 9 shows the rules in position with the reinforcing bars in place, and after this is done, a commercial epoxy resin having a commercial hardener therein, in the ratio of approximately 10 parts by weight of the resin to one part by weight of the hardener, is placed within the frame that is around the rules to the level of the uppermost (or base) edges of the rules. If the upper edges of the frame are coplanar with said base edges, a scraper 39 may be moved over the frame to scrape any of the epoxy plastic off the base edges of said rules and to level the plastic between and around the rules. Also the frame will define the boundaries of the die. It is imperative that the base edges of the rules be clean and that there be no material projecting beyond said edges. The epoxy resin is designated 38.

As for the epoxy, the type known in the trade under the designation Epolite 30 has been found to be satisfactory, and the hardener known as 932B Resolin hardener, has been found to be satisfactory. This mixture will harden sufficiently at atmospheric temperature within three to four hours, and it has been found that the addition of a corfil material, such as powdered walnut shells in the amount of approximately 47% of the total, by weight, not only reduces the weight of the die but does not impair its strength for the use for which it is intended, and greatly reduces the cost.

Also, in filling the frame with the plastic mixture, when it is partially filled, blocks 40 of wood or any other suitable material may be, and preferably are, positioned in the larger areas where they will not interfere with the rules. These blocks are, of course, spaced from the rules, so that the plastic will hold the rules. The use of these blocks further reduces the weight of the die and overcomes any tendency that might otherwise exist, for the die to warp on drying, although such warpage seldom occurs and the blocks are not essential in most instances. They are preferably used however to guard against the possibility, and to strengthen the die and to make it lighter in weight and more economical to make.

The body of plastic and the rules, as a unit, are removed from the mold upon the die hardening, and after suitable corking 42 is received on the face of the plastic body at such locations as are found to be desirable, the die may be locked or held in a conventional chase in a press, either alone or with any desired number of other corresponding dies.

When the dies are used in a blank cutting and creasing operation their life is indefinite, and if any one or more of the rules should become dull, nicked or in any way injured, such rules can readily be withdrawn by a conventional rule puller and replaced. The rules will not shift relative to each other, and perfect uniform duplication of blanks will be maintained for the life of the dies.

When and if desired, the corking can be readily removed by merely using steam, whereas in the conventional wooden dies a special solvent is used and the die must be scraped clean.

Due to the fact that the conventional mold employing the wooden rule supporting blocks is easily damaged, such as by striking the rules or dropping the die, and in many other ways, it is preferable that a durable master die be made as soon as possible from the die 1, and thereafter this master die be used for making the rule supporting molds.

Such master mold is made in exactly the same way as the working dies above described, except that the layer of material removed from panel 22 after the casting material has been poured and hardened, and after the panel is removed from the die, is thinner than where the mold is to be used for a working die, so that subsequent molds made from the plastic master die may be planed or cut down to make the depths of the grooves 34 exactly equal to the desired height of the projecting portions of the rules in the final working die.

It should be pointed out that the surfaces on the mold and rules that are engaged by the epoxy resin are preferably coated with a parting wax so that the plastic will not stick to the mold and rules.

Also, in separating the mold from the die, the metal or casting material in the openings 29 provide knockout pins, which, when tapped from the side of the mold opposite to the rules, will cause the die to be easily and quickly separated from the mold.

In the making of the mold, it is obvious that certain modifications may be made, however, the method as described has been found to be the most satisfactory, since the panel itself provides a base for the casting material which is the bottoms of the recesses, and such islands as may be left, as indicated at 43 (FIG. 5) are integral with the panel and form means for locking the casting material to the panel.

Insofar as the knockout pins are concerned, it should be noted that these pins are ordinarily purchased and fitted in openings, whereas in the present invention they are cast in place at the same time the mold is made.

The total time required for routing out the panel 22, pouring the metal or casting material into the recesses and openings with the panel over the die; and the finishing of the mold, including the time for cooling and hardening the metal, is from twenty to thirty minutes. The advantage of using the metal, at the present time, is obvious, since the most suitable plastic available at this time would require three to four hours time for curing, and would not provide a sufficiently close and firm support for the rules.

It is to be understood that modifications may be made in the method and structure described, and the claims hereafter are intended to cover any modifications that may come within the scope of the claims.

We claim:
1. A method of making a rule supporting mold for a die for making a cardboard blank that includes the steps of; forming a continuous, relatively wide recess as compared with the thickness of the rules to be supported, in one side of a panel along a line that defines the outline of said blank, then positioning one of the edges of rules within said recess including the marginal portions of said rules along said edges with said marginal portions and said edges spaced from the opposite sides of said recess and the bottom of said recess respectively and with said rules disposed along a line that exactly follows the outline of said blank, then casting a material in said recess in tight inseparable engagement with the sides and bottom of said recess and in releasable engagement with said edges and marginal portions of said rules along opposite sides of the latter, and permitting said casting to harden whereby said panel will carry a mold formed with a groove that is exactly complementary to said rules along their said edges and said marginal portions when said rules are removed from said material.

2. A method of making a rule supporting mold for a die for making a cardboard blank that includes the steps of; routing out a continuous relatively wide recess as compared with the thickness of the rules to be supported, in one side of a wooden panel along a line that defines the outline of said blank and forming through openings in said panel communicating between said recess and the side of said panel opposite thereto, then positioning the cutting edges of blank cutting rules and the marginal portions along said edges a uniform distance into said recess spaced from the sides and bottom of the latter and along a line that precisely follows the outline of the blank to be made, then pouring a molten casting metal through said openings and into said recess to fill said recess to a level covering said marginal portions and in releasable engagement therewith, then permitting said material to harden, and finally removing said panel and said casting material from said rules whereby said casting material will be formed with a recess that is exactly complementary to said rules to the depth of said marginal portions.

3. A method of making a rule supporting mold for a die for making a cardboard carton blank of the type having different complicated cooperatively engageable parts that includes the steps of; forming recesses that are wider than the thickness of the rules to be supported, in one side of a panel and along lines that generally follow the outline of the blank to be formed including portions to be cut and creased within the outline of said blank; then positioning and supporting one of the marginal portions of the cutting and creasing rules for forming said blank a uniform distance into said recesses spaced from the bottom and opposite sides of the latter and along lines that exactly follow said outline and said parts, then casting a material in said recesses in tight engagement with the opposite sides and bottoms of said recesses and in tight but releasable engagement with said marginal portions of said rules and the cutting and creasing edges thereof, then permitting said casting material to harden, and finally removing said rules from said material whereby said panel will carry a metal mold having recesses therein that are exactly complementary to the cutting and creasing edges of rules positioned along lines defining the outline of the blank to be formed including the outline and crease lines of said cooperatively related parts within said blank.

4. A method of making a rule supporting mold for use in making a die for cutting and creasing cardboard blanks comprising the steps of; cutting a relatively wide outwardly opening recess with respect to the thickness of the rules to be supported, in one side of a panel along lines defining the outline of the blank to be formed by said die including parts to be cut and creased within said blank, then positioning said panel with its recesses directed downwardly, over a die having rules accurately defining said outline projecting a uniform distance from a side of said die against said one side of said panel with the projecting portions of said rules extending a uniform distance into said recess and spaced from the sides and bottom of said recess whereby said one side of said die will close the open side of said recess, then filling said recess with a casting material in cast engagement with the said projecting portions of said rules, permitting said material to harden and then removing said die from said panel and material whereby said material in said recess will be formed with a groove that is the exact complement of said projecting portions of said rules.

5. A method of making a rule supporting mold for use in making a die for cutting and creasing cardboard blanks comprising the steps of; cutting a relatively wide outwardly opening recess with respect to the thickness of the rules to be supported, in one side of a panel along lines defining the outline of the blank to be formed by said die including parts to be cut and creased within said blank, then positioning said panel with its recesses directed downwardly, over a die having rules accurately defining said outline projecting a uniform distance from a side of said die against said one side of said panel with the projecting portions of said rules extending a uniform distance into said recess and spaced from the sides and bottom of said recess whereby said one side of said die will close the open side of said recess, then filling said recess with a casting material in cast engagement with the said projecting portions of said rules, permitting said material to harden and then removing said die from said panel and material whereby said material in said recess will be formed with a groove that is the exact complement of said projecting portions of said rules, then cutting a thin layer of said panel and said material of a thickness substantially less than the depth of the groove formed in said material from the side of said panel in which said recess for said material is formed to provide a smooth level planar surface on said one side of said panel for supporting die casting material thereon and around rules adapted to be supported in said groove.

6. A method of making a master pattern for use in making a rule supporting molds for making dies to form carton blanks that comprises the steps of; forming a continuous relatively wide recess as compared with the thickness of the rules to be supported, in one side of a panel along lines that define the outline of said blank, then positioning one of the edges of rules within said recess including the marginal portions along said edges with said marginal portions and said edges spaced from opposite sides of said recess and bottom respectively and with said rules and projecting into said recess a distance substantially greater than the distance that said rules will project from a side of the die to be used for forming said blank, and with said rules disposed along lines that exactly follow the outline of said blank, then casting a material in said recess in tight inseparable engagement with the sides and bottom thereof and in releasable engagement with said edges and marginal portions of said rules, permitting said material to harden, then removing said rules whereby a groove exactly complementary to said marginal portions will be in said material, removing a layer of said panel and said material from said one side to form a smooth planar surface on said one side with said groove still extending into said material from said planar surface a greater distance than the distance the rules are to project from the die for forming said blanks, then again positioning the said rules in said groove and casting a holding material around them to form a block carrying said rules with the latter projecting from a side thereof a greater distance than said rules are to project from the die for forming said blank, then removing said rules as a unit with said block from said grooves, and thereafter supporting said block on one side of a panel formed with a recess corresponding to said first mentioned recess and repeating said steps connecting with the casting of said material in said recess to the step of removing a layer of said panel and said material therefrom, and finally removing such layer to a depth in which the groove in said material will equal the distance the rules in the die to be formed will project from a side of such die.

7. The method of making a mold to be used in making a carton forming die, comprising the steps of; fabricating an accurate pattern in the form of a conventional die having the cutting and creasing edges of cutting and creasing rules including the marginal portions of such rules projecting from one side of the die, forming a recess in one side of a block to receive therein said edges and marginal portions in spaced relation to the sides and bottom of said recess, supporting said block over said edges and marginal portions with said edges and marginal portions within said recess and spaced from the sides and bottom of the latter and then forming a mold within said recess filling the latter and engaging said edges and marginal portions to thereby provide an accurate impression of said edges and marginal portions in said mold.

8. A method of making a carton blank forming die comprising the steps of; fabricating an accurate pattern in the form of a conventional die having the edges of the cutting and creasing rules thereof projecting from one side of said die, forming recesses in one side of a panel following the outline of said edges but substantially wider than the thickness of said rules, supporting said panel on said die with said edges projecting into said recesses, filling said recesses with molten casting material in cast engagement with said projecting edges and with the sides and bottoms of said recesses, permitting said material to harden, removing said panel and said material as a unit from said die and from said projecting edegs whereby the said material will be formed with an accurate impression of said edges, supporting rules in said impression, filling the spaces between said rules with a hardening plastic and positioning solid blocks within certain of said spaces fully enclosed within the plastic therein, and thereafter permitting said plastic to harden, and then removing said panel from said plastic and rules.

9. The method of making a rule supporting mold from a conventional wooden fixture die of the type having a wooden body with steel rules rigid relative to each other thereon and which rules have their working edges projecting from a side of said body that comprises the steps of: forming a recess in one planar side of a rigid panel along lines corresponding to the outline defined by said working edges, then suspending said cutting edges and the marginal portions of said rules along said edges within said recess spaced from the sides and bottom of said recess, then casting a material in said recess in tight inseparable relation with the sides and bottom of said recess in releasable engagement with said edges and said marginal portions, and then removing said die including said rules from said material and thereafter inserting in said recess the working edges and marginal portions of rules that are identical with the rules of said die.

References Cited in the file of this patent

UNITED STATES PATENTS

| | | |
|---|---|---|
| 416,115 | Mayall | Mar. 26, 1889 |
| 770,139 | Wood et al. | Sept. 13, 1904 |
| 1,043,831 | Heinkel et al. | Nov. 12, 1912 |
| 1,171,818 | Walpole | Feb. 15, 1916 |
| 1,181,178 | Simms | May 2, 1916 |
| 1,342,239 | Walter | June 1, 1920 |
| 1,647,415 | Preston | Nov. 1, 1927 |
| 2,108,996 | Sansome | Feb. 22, 1938 |
| 2,127,131 | Moeller | Aug. 16, 1938 |
| 2,263,001 | Gunsaulus et al. | Nov. 18, 1941 |
| 2,459,543 | Schmerheim | Jan. 18, 1949 |
| 2,460,874 | Coberly | Feb. 8, 1949 |
| 2,500,857 | Norberg | Mar. 16, 1950 |
| 2,593,547 | Duerksen | Apr. 12, 1952 |